United States Patent
Insley

(10) Patent No.: US 6,913,853 B1
(45) Date of Patent: Jul. 5, 2005

(54) INTEGRAL BATTERY AND RECHARGER

(75) Inventor: Bryan Insley, Solihull (GB)

(73) Assignee: Uni-Lite International Limited, Worcestershire (GB)

( * ) Notice: Subject to any disclaimer, the term of this patent is extended or adjusted under 35 U.S.C. 154(b) by 358 days.

(21) Appl. No.: 10/031,745

(22) PCT Filed: Jul. 7, 2000

(86) PCT No.: PCT/GB00/02608
§ 371 (c)(1),
(2), (4) Date: Apr. 24, 2002

(87) PCT Pub. No.: WO01/08249
PCT Pub. Date: Feb. 1, 2001

(30) Foreign Application Priority Data

Jul. 24, 1999 (GB) .............................................. 9917337

(51) Int. Cl.[7] .......................... H01M 2/10; H01M 10/46
(52) U.S. Cl. .............................. 429/100; 429/7; 429/96; 429/176; 320/111; 439/500; 439/501
(58) Field of Search ................................ 429/176, 100, 429/96, 7; 320/111; 439/500, 501

(56) References Cited

U.S. PATENT DOCUMENTS

| | | |
|---|---|---|
| 4,086,523 A | 4/1978 | Izumi |
| 4,191,917 A | 3/1980 | Brown et al. |
| 5,038,093 A * | 8/1991 | Edwards et al. ............ 320/106 |
| 5,449,567 A | 9/1995 | Yeh |
| 6,562,509 B1 * | 5/2003 | Eggert .......................... 429/96 |

FOREIGN PATENT DOCUMENTS

| | | |
|---|---|---|
| CH | 389700 | 7/1965 |
| FR | 2520939 | 2/1982 |

* cited by examiner

*Primary Examiner*—John S. Maples
(74) *Attorney, Agent, or Firm*—Venable LLP; Michael A. Sartori; Daniel G. Vivarelli

(57) ABSTRACT

An integral battery and recharger is described. The battery includes a battery housing, battery terminals and plug pins for location in a plug socket and operable to effect recharging of the battery when connected to an AC supply. The battery housing is generally designed to be received in a close fitting cavity (33) of a battery powered device. The part of the housing from which the plug pins project is designed to be sufficiently spaced, in use, from the walls of the cavity to allow the plug pins which project therefrom to fully extend part and the cavity. Preferably, the side from which the pins project extends at substantially 45° with respect to the said adjacent sides to form the third side of a three sided battery housing. A method of using and recharging a battery located in a battery powered device is also described.

13 Claims, 5 Drawing Sheets

INTEGRAL BATTERY AND RECHARGER

The present invention relates to an integral battery and recharger device.

Rechargeable battery devices are well known for two prong plug sockets used in many countries. For instance, U.S. Pat. No. 4,086,523 describes a rechargeable battery device including a storage cell, a housing enclosing the storage cell, a rectifier in the housing and a pair of output terminals exposed for delivering electrical energy from the storage cell. The battery is provided with a pair of prongs arranged for electrical connection to a female power supply receptacle. The prongs are pivotally mounted at opposite sides of one of the terminals to extend selectively in a first disposition straddling one end of the housing, and a second disposition projecting from that one end in a parallel spaced relationship to be received in the female power receptacle. The electrical circuit of the rechargeable battery includes a switch for electrically connecting the prongs to the rectifier and storage cell to permit recharging of the storage cell from the female power supply receptacle only when the prongs are disposed in the extended disposition. The prongs may be biased both to the retracted disposition and the extended disposition, and at least one of the contacts may be a spring contact for effectively maintaining electrical connection between the prongs and the charging circuitry. One of the contacts of the switches may be defined by a portion of the prongs. Similarly, U.S. Pat. No. 5,449,567 describes a rechargeable battery including a hollow battery housing having a top end provided with a positive battery terminal, a bottom end provided with a negative battery terminal and a surrounding wall that confines a cell receiving space and a prong receiving space. A prong unit including a prong base disposed slidably in the prong receiving space, a pair of prongs connected at one end to the prong base, and a slide button extending through a longitudinal slot in the surrounding wall of the battery housing and connected to the prong base. The slide button is operable manually to move the prongs selectively between a first position, wherein the prongs are fully retracted in the prong receiving space, and a second position, wherein the prongs extend out of the prong receiving space via prong holes at the top end of the battery housing for connection to an electrical outlet.

These publications typify the prior art in this area which addresses the problem of how to remove the integral prongs after recharging is complete so that the device may once again be used as a battery.

According to a first aspect of the present invention there is provided an integral battery and recharger comprising a battery housing, battery terminals and plug pins for location in a plug socket and operable to effect recharging of the battery when connected to an AC supply, the battery housing being generally designed to be received in a close fitting cavity of a battery powered device, wherein the part of the housing from which the plug pins project is designed to be sufficiently spaced, in use, from the walls of the said cavity to allow the plug pins which project therefrom to fully extend in the space provided between the said part and the said cavity.

The housing may be shaped so as to be securely locatable in the cavity in a manner which is independent of the pins. Alternatively, the ends of the pins may extend, in use, as far as the cavity and contribute to the stability of the unit in the cavity.

Preferably, the ends of the pins provide two point, more preferably, three point stabilising contact, in use, with the cavity without causing, or preferably, allowing the battery to be moved out of position within the cavity.

Preferably, the plug pins project outwardly from a side of the housing and, preferably, are fixed in the same position with respect to the housing during recharging and during use of the battery in a battery powered device.

Preferably, the battery is designed for location in a generally four-sided cross-section elongate cavity, preferably, a rectangular cross-section with bevelled angles.

The prior art battery housing for such prior art cavities would commonly also be a generally rectangular, bevelled angled, cross-section elongate battery housing for close fitting engagement with the battery cavity. However, in a preferred embodiment of the invention a corner of such a prior art housing would be cut-away to provide a generally flat face, preferably, longitudinally parallel with the remaining sides of the housing, preferably, disposed approximately 45° thereto. The plug pins may be fitted to project outwardly from this face of the housing and the depth of imaginary cut-off of the corner is that required for the pins to fully extend, in use as a battery, without projecting beyond the cavity walls.

Preferably, therefore, the housing has three sides in end section.

In preferred embodiments, the corners between sides of the housing are bevelled.

The bevelled edges are, preferably, of sufficient radius and arc length to stabilise the three-sided housing against rotation in a four sided cavity.

Preferably, the plug pins project outwardly perpendicular from the cavity spaced face of the housing.

Preferably, the battery housing has a top face from which at least one, preferably two, battery terminal(s) project(s) and a bottom face from which battery terminals may also project.

The pins may be of a three pin or two pin construction. Preferably, the positive and negative pins abut, in use, adjacent sides of the cavity respectively to thereby provide additional rotational and lateral stability for the battery within the cavity.

When used, the earth pin, preferably, extends towards and may abut, in use, a corner of the cavity between adjacent sides thereof. In such a manner the earth pin may also provide additional rotational and lateral stability for the battery in the cavity.

Preferably, two adjacent sides of the battery housing extend substantially at right angles to each other. Preferably, the side from which the pins project extends at substantially 45° with respect to the said adjacent sides to form the third side of a three sided battery housing, preferably, suitable for location in a four sided cavity of a battery powered device, preferably, in such a manner that there is sufficient space between the cavity spaced side and the cavity walls to allow two-pin or three pin plug pins to fully extend therefrom without extending beyond the walls of the cavity.

According to a second aspect of the present invention there is provided a battery powered device comprising a battery cavity for receiving a battery housing and a battery located in the said cavity, the battery being according to the first aspect of the present invention. Preferably, the cavity is an elongate rectilinear construction to accommodate the said battery, preferably, the cavity is four sided. Preferably, the angles between the sides of the cavity are bevelled.

The second aspect of the invention may incorporate any one or more of the preferred features of the first aspect of the invention except where such features are mutually exclusive.

Advantageously, the battery design is such as to minimise loss of battery housing volume whilst maintaining rotational lateral and rocking stability for the battery within the battery cavity. A further advantage is the use of the pin ends to further stabilise the battery in the same manner. A still further advantage is provided during recharging because the pins project from the side of the battery housing as opposed to the ends of an elongate battery and the battery housing is thus more compact with respect to the wall and socket, preventing inadvertent dislodgement of the battery or failure to be able to utilise the battery in limited space locations.

The interior of the battery itself is, typically, of a common construction and is adapted to be interchangeable with a conventional dry cell battery comprising a housing containing therein storage cell means, charging means connected to said storage cell means and socket pins connecting, in use, said charging means to a power source socket.

Preferably, the pins are fixed and permanently extend from the said side of the device.

According to a third aspect of the present invention there is provided a method of using and recharging a battery located in a battery powered device comprising the steps of:— using the said battery powered device in battery powered mode;

removing the battery having integral plug pins projecting therefrom from the battery powered device;

and plugging the said plug pins into a power source socket for recharging the said battery wherein the position of the plug pins are continuously fixed in the same position with respect to the battery housing during the aforementioned steps.

An embodiment of the invention will now be described, by way of example, with reference to the accompanying drawings in which:—

Figure 1:
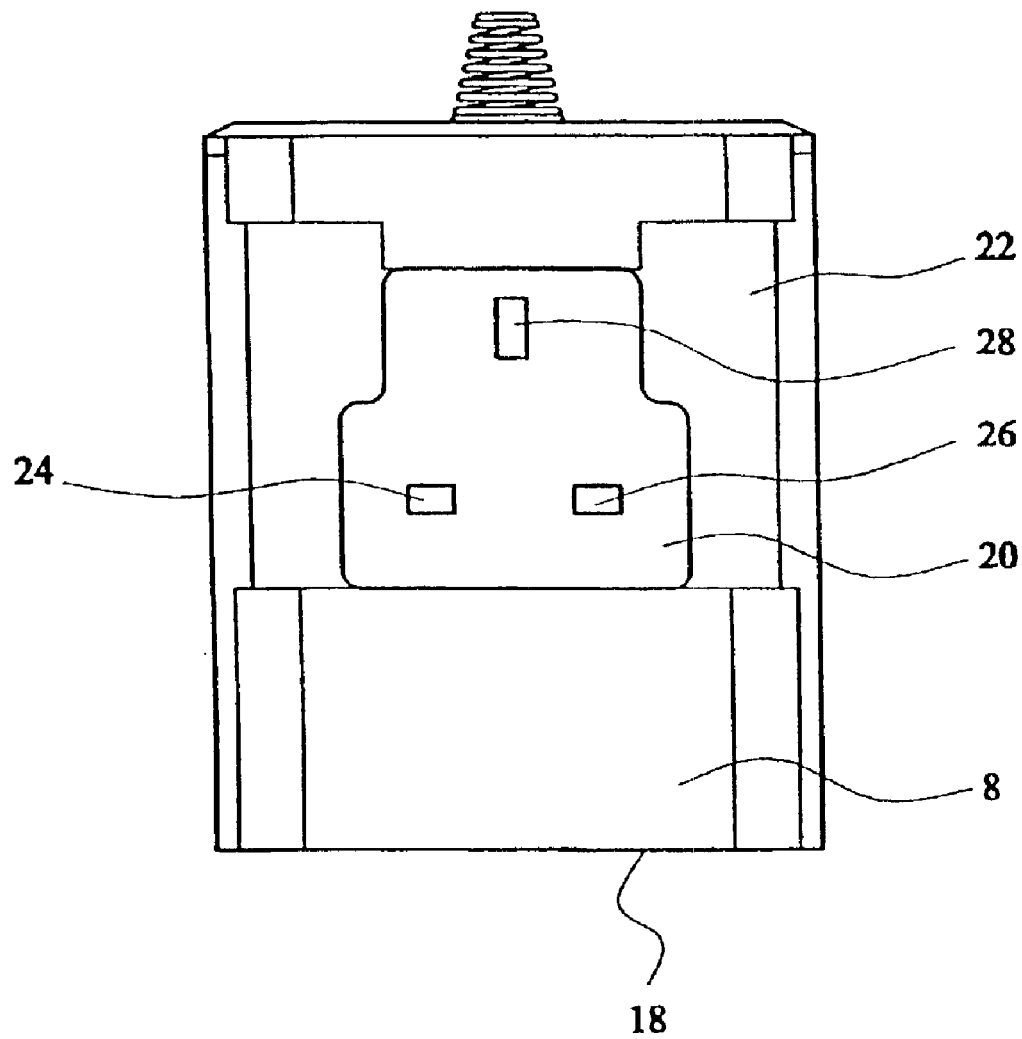
FIG. 1 shows a perspective view of a battery in accordance with the present invention.
Figure 2:
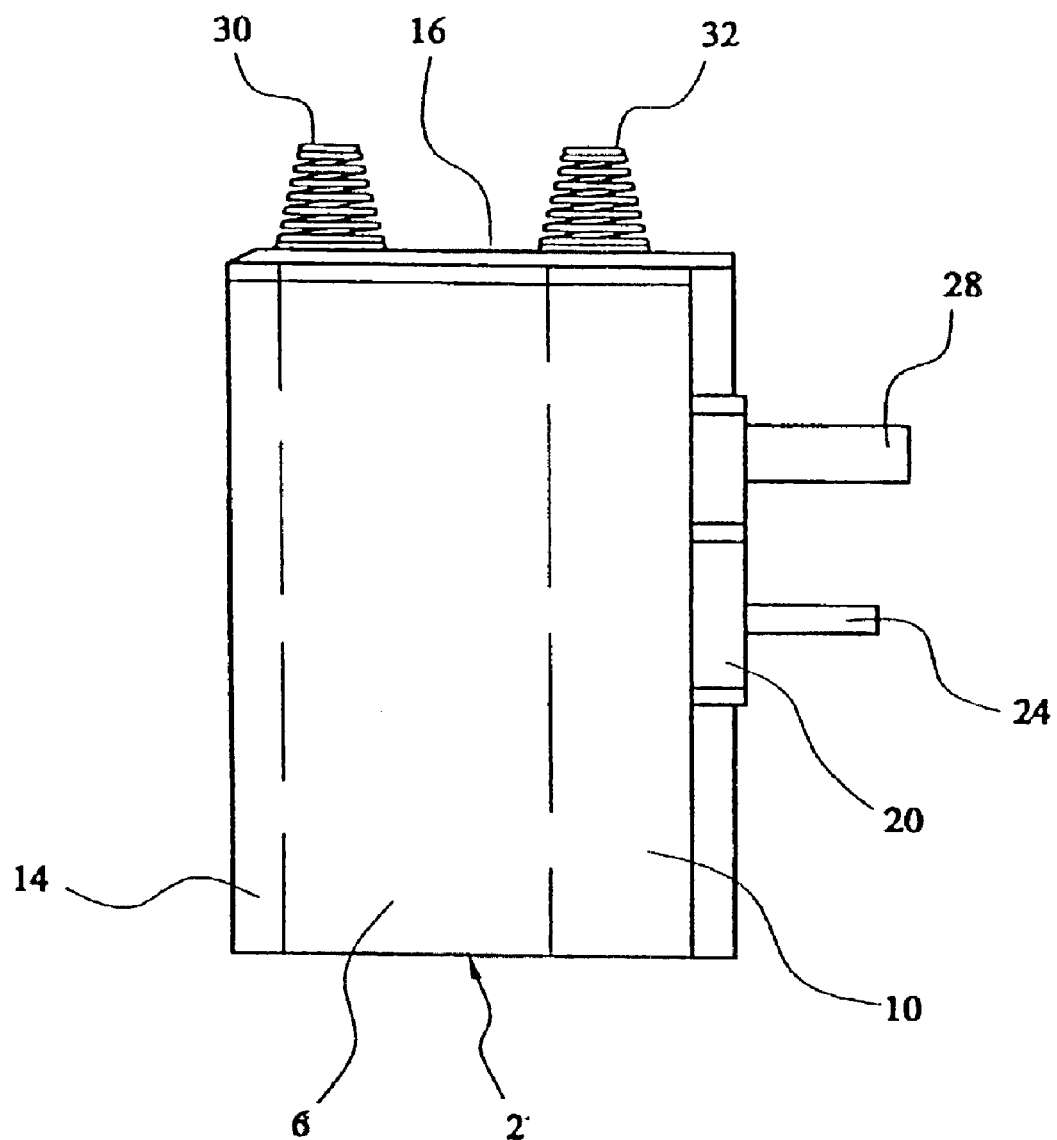
FIG. 2 shows a side elevation of the battery of FIG. 1.
Figure 3:
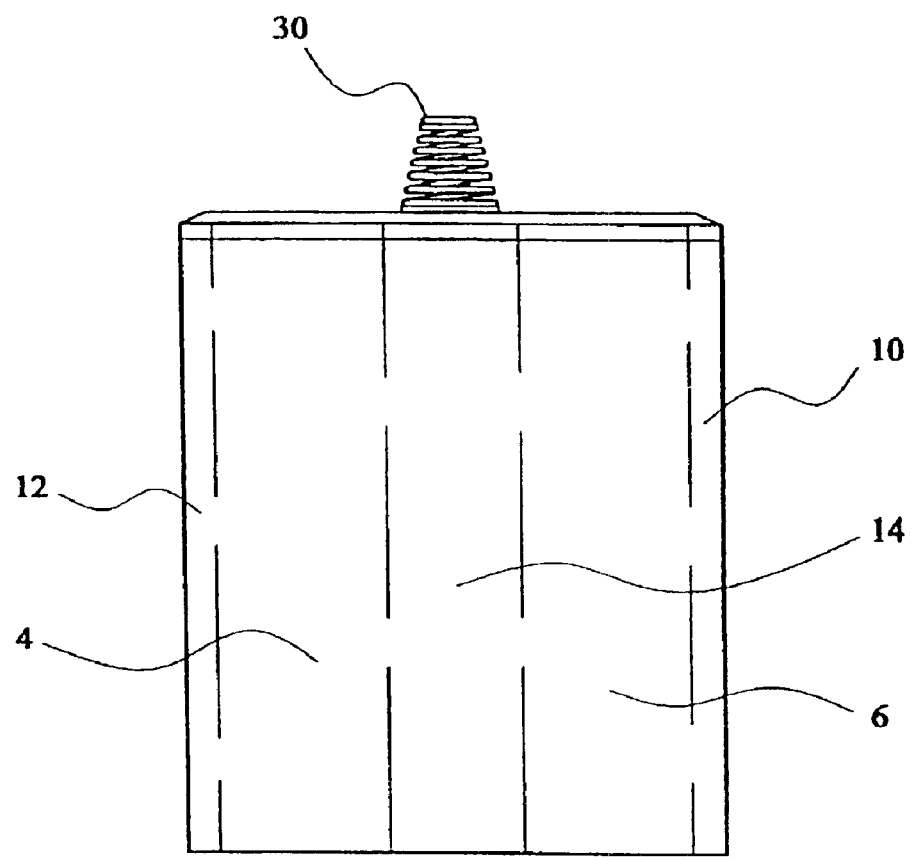
FIG. 3 shows a rear elevation of the battery of FIG. 1.
Figure 5:
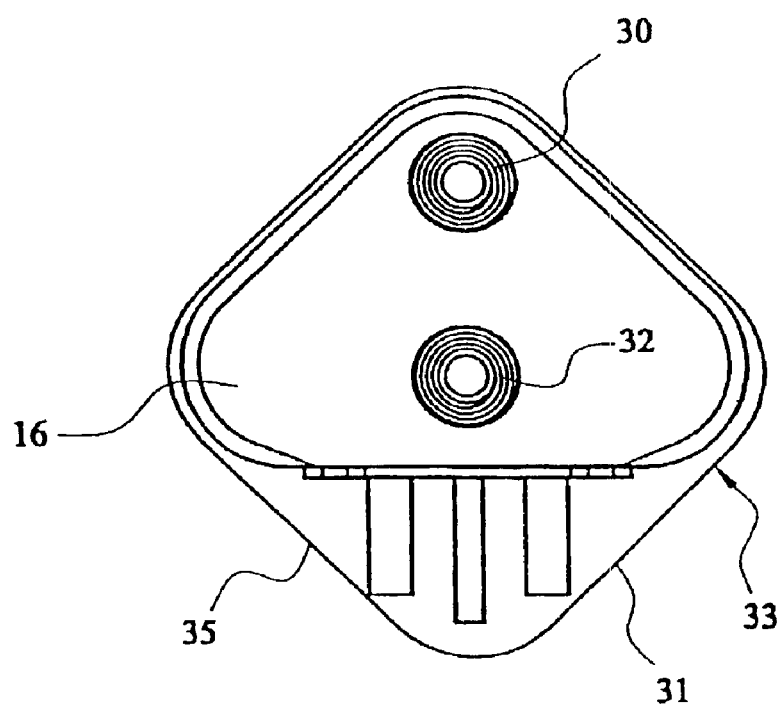
FIG. 5 shows a plan view of the battery of FIG. 1.
Figure 4:
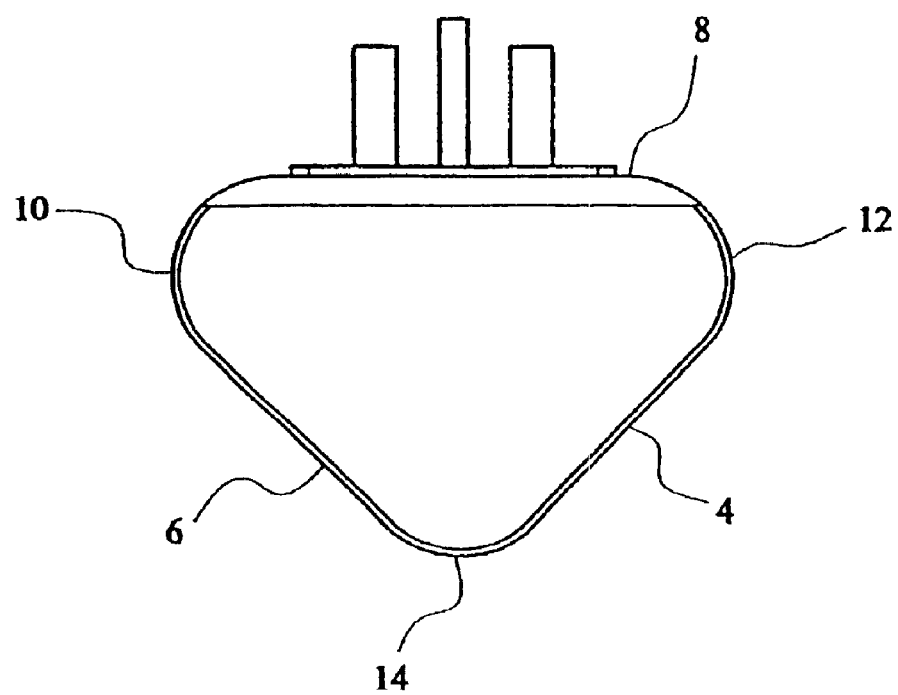
FIG. 4 shows an underplan view of the battery of FIG. 1.

Referring to FIGS. 1–5, a battery housing 2 comprises two perpendicular adjacent elongate sides 4, 6; a third side 8 extending at 45° to the said adjacent sides 4, 6; bevelled edges 10–14 between each adjacent sides 4, 6 and 8; a top plate 16; and a bottom plate 18. The battery is designed to be located in a bevelled angled rectangular end-section elongate cavity of a battery powered device. The cavity having sides equivalent in width to adjacent sides 4, 6 and of corresponding height to the battery housing 2. The battery housing 2 is located in the rectangular bevelled angled section elongate housing in such a manner that the adjacent sides 4, 6 are located against two adjacent sides of the cavity and the bevelled edges 10, 12, 14 are located against corresponding bevelled angles in the cavity. In this manner, the third side 8 of the housing 2 is substantially spaced from the remaining bevelled angle of the cavity.

A 3 pin plug plate 20 resides in a recessed area 22 formed in the third side 8 of the battery housing 2 in such a manner that the pins of the plate project outwardly therefrom perpendicular to the surface of the third side 8. The plug plate 20 is centrally located in the third side 8 of the battery housing 2 in such a manner that the positive terminal 24 and the negative terminal 26 project outwardly from a height midway between the top and bottom of the side 8 and the earth pin 28 located above the positive and negative pins projects outwardly midway between the side edges of the third plate 8. In use, the cavity spaced side 8 of the housing 2 is sufficiently spaced, in use, from the sides of the cavity to allow each of the pins 24, 26, 28 to fully extend into the space without extending beyond the walls of the cavity. In the embodiment shown, the pins extend as far as the walls of the cavity to provide, in use, three point stabilising contact with the walls of the cavity. Positive and negative pins 24, 26 each abut against adjacent sides of the cavity respectively and the end of the earth pin 28 abuts against the fourth bevelled edge of the cavity.

The top plate 16 of the battery housing 2 has two spring terminals 30, 32 extending upwardly therefrom corresponding to the positive and negative terminals of the battery. In use as a battery, the unit is located within a bevelled angled rectangular section elongate cavity of a battery powered device (33) and a cap is generally fitted onto the device with corresponding circuit contacts matching the position of the terminals 30, 32 so that battery powered action of the device may take place. The bevelled edges of the battery housing together with the ends of the plug pins provide stable positioning of the battery within the housing. As can be seen from FIG. 5, the positive and negative plug pins may abut the walls 31, 35 of the cavity 33 to provide stability and a unique battery locating design.

Once the life of the battery has expired, the battery may be removed from the cavity and plugged into a suitable power source wall socket for recharging. After recharging of the device, the unit may once again be used as a battery.

The invention thus provides a very convenient integral recharging unit which does not require capping of the pins during use as a battery or folding away or relocation of the pins during battery use. Accordingly, the battery may be immediately used for recharging without the necessity to adjust any components of the battery.

Although the battery housing may be used without the requirement of a cap to cover the pins, it is envisaged that a capped version of the battery may be utilised in two ways. The negative and positive terminals of the battery could be capped during recharging so that they are isolated and a suitable sized cap would be obvious to those skilled in the art. Furthermore, a cap may be located over the plug pins and this cap may, optionally, provide a rectangular bevelled edge section, elongate shape for the housing. In this manner of use, the ends of the three pin or two pin plug pins may stabilise the cap in position so that the cap, in turn, stabilises the battery housing in position in the cavity.

Although a three pin plug has been described it would be apparent that the invention may also be utilised for a two pin plug although such would provide less stability with only two point instead of three point contact.

Figure 6:
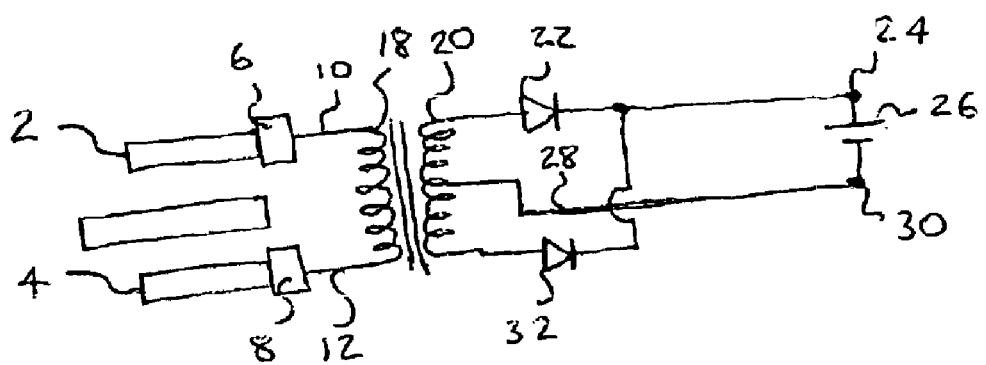
FIG. 6 shows a suitable circuitry for recharging.

Within the housing of the integral recharger, is located suitable recharging circuitry as described with reference to FIG. 6 below.

Suitable recharging circuitry will be known to those skilled in the art. U.S. Pat. No. 5,449,567 describes suitable recharging circuitry for an integrated battery and recharger and FIGS. 3–10 of this patent are incorporated herein by references as examples of suitable recharging circuitry.

Simple recharging circuitry is also defined in U.S. Pat. No. 4,086,523, FIG. 5. Referring to FIG. 6, a suitable two-pin recharging circuit is shown where the negative and positive prongs 2, 4 are connected by suitable contacts 6,8 and wires 10, 12 to opposite ends 14, 16 of the transformer primary winding 18. A secondary transformer winding 20 is connected with a rectifier 22 to terminal 24 of storage cell 26 and a centre connection 28 is connected from the transformer secondary winding 20 to the terminal 30 of storage cell 26. The other end of the secondary winding 20 is connected with rectifier 32 to storage cell terminal 24. Accordingly in use, an AC current is provided to the transformer primary winding and the transformer reduces the voltage supply to provide a suitable charging voltage to the battery cell via the rectifiers 22, 32 which provide a full wave rectification of the alternating current power supply.

United Kingdom Patent Application No. 9917337.9, filed Jul. 24, 1999, and International Application No. PCT/GB00/02608, filed Jul 7, 2000, are incorporated herein by reference.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. An integral battery and recharger comprising a battery housing, battery terminals and plug pins for location in a plug socket and operable to effect recharging of the battery when connected to an AC supply, the battery housing being generally designed to be received in a close fitting four-sided cross-section elongate cavity of a battery powered device, wherein the housing has three sides in end-section and wherein the part of the housing from which the plug pins project is designed to be sufficiently spaced, in use, from the walls of the said cavity to allow the plug pins which project therefrom to fully extend in the space provided between the said part and the said cavity.

2. An integral battery and recharger according to claim 1, wherein the housing is shaped so as to be securely locatable in the cavity in a manner which is independent of the pins.

3. An integral battery and recharger according to claim 1, wherein the ends of the pins extend, in use, as far as the cavity and contribute to the stability of the unit in the cavity.

4. An integral battery and recharger according to claim 1, wherein the ends of the pins provide two point stabilising contact, in use, with the cavity.

5. An integral battery and recharger according to claim 1, wherein the plug pins project outwardly from a side of the housing.

6. An integral battery and recharger according to claim 1, wherein the plug pins are fixed in the same position with respect to the housing during recharging and during use of the battery in a battery powered device.

7. An integral battery and recharger according to claim 1, wherein the cavity has a rectangular cross-section with bevelled angles.

8. An integral battery and recharger according to claim 1, wherein the plug pins project outwardly perpendicular from the cavity spaced face of the housing.

9. An integral battery and recharger according to claim 1, wherein the positive and negative pins abut, in use, adjacent sides of the cavity respectively to thereby provide additional rotational and lateral stability for the battery within the cavity.

10. An integral battery and recharger according to claim 1, wherein two adjacent sides of the battery housing extend substantially at right angles to each other.

11. An integral battery and recharger according to claim 1, wherein the side from which the pins project extends at substantially 45° with respect to the said adjacent sides to form the third side of a three sided battery housing.

12. A battery powered device comprising a battery cavity for receiving a battery housing and a battery located in the said cavity, the battery being according to claim 1.

13. A method of using and recharging a battery located in a battery powered device, wherein the housing of said battery is generally designed to be received in a close fitting four-sided cross-section elongate cavity of the device, wherein the housing has three sides in end-section, wherein the part of the housing from which the plug pins project is designed to be sufficiently spaced, in use, form the walls of the said cavity to allow the plug pins which project therefrom to fully extend in the space provided between the said part and the said cavity, and wherein said method comprises the steps of using said battery powered device in battery powered mode; removing the battery having integral plug pins projecting therefrom from the battery powered device; and plugging the said plug pins into a power source socket for recharging the said battery wherein the position of the plug pins are continuously fixed in the same position with respect to the battery housing during the aforementioned steps.

* * * * *